Patented Aug. 31, 1954

2,687,941

UNITED STATES PATENT OFFICE 2,687,941

DYESTUFFS

Victor S. Salvin, Irvington, and John R. Adams, Jr., Summit, N. J., assignors to Celanese Corporation of America, New York, N. Y., a corporation of Delaware No Drawing. Application March 26, 1952, Serial No. 278,738

15 Claims. (Cl. 8—57)

This invention relates to dyestuffs and is particularly concerned with dyestuffs suitable for the coloration of organic derivative of cellulose materials in blue shades which are fast to acid fading.

In the coloration of textile materials it is very desirable that the colors produced on the materials be as fast as possible to light, washing and to other agencies such as acid fumes. Many dyestuffs, such as those produced by the condensation of naphthazarin intermediate with aromatic amines such as aniline, p-phenylene diamine, p-amino phenol and the like, yield on organic derivative of cellulose materials blue colors which are fast to light and washing, but these colors often suffer from a lack of fastness to acid fumes. When materials to which these dyestuffs are applied are exposed to acid fumes, for example, of the type produced by the combustion of coal, gas, etc., the color undergoes an undesirable change. This change is usually referred to as acid fading or gas fading. When materials dyed with these dyestuffs are exposed to acid fumes, the colors tend to change from a blue shade to one having a reddish cast. On continued exposure to acid fumes the blue color may even change to a pink color. Such changes obviously restrict the range of usefulness of these dyestuffs and the organic derivative of cellulose materials dyed therewith.

It is an important object of this invention to provide a dyestuff which will dye organic derivative of cellulose materials in blue shades having an improved resistance to acid fading.

A further object of this invention is to provide a novel dyestuff by the condensation of naphthazarin intermediate with a hydroxy alkyl amino benzene.

Other objects of this invention will be apparent from the following detailed description and claims.

It has now been found that dyestuffs prepared by the condensation of naphthazarin intermediate and a hydroxy alkyl amino benzene, such as for example, m-amino benzyl alcohol, m-amino phenyl-methyl carbinol, 2-methyl-5-amino benzyl alcohol, 4-methyl-3-amino benzyl alcohol, 2-methoxy-5-amino benzyl alcohol, 4-methylol-5-amino benzyl alcohol and p-amino phenyl ethyl alcohol will dye organic derivative of cellulose materials in blue shades that exhibit an improved resistance to acid fading.

Naphthazarin intermediate is 5-amino-8-hydroxy-1,4-naphthaquinone-1-imine and may, for example, be prepared by the treatment of 1,5-dinitronaphthalene with sulfur sesquioxide in sulfuric acid solution. After neutralization, filtering, washing and drying, the naphthazarin intermediate is dissolved in acetic acid, which may be glacial acetic acid or which may contain up to about 30% by weight of water. Advantageously, there are employed from about 5 to 60 parts by weight of the acetic acid solvent for each part by weight of the naphthazarin intermediate. The solution may also contain as a buffer from about 1 to 3 parts by weight of sodium acetate, sodium carbonate or potassium dihydrogen phosphate for each part by weight of the naphthazarin intermediate. To the solution are also added from about 1.0 to 3.0 or preferably from about 1.5 to 3.0 mole equivalents of the hydroxy alkyl amino benzene for each mole equivalent of the naphthazarin intermediate. When equal molar equivalents of the hydroxy alkyl amino benzene and naphthazarin intermediate are reacted, the dyestuff obtained dyes organic derivative of cellulose materials in blue shades having an undesirable reddish hue which exhibit a somewhat poorer resistance to acid fading than when the preferred proportions of reactants are employed. The reaction between the naphthazarin intermediate and the hydroxy alkyl amino benzene are effected by heating the solution to a temperature of between about 80 and 100° C. for a period of between about 1 and 3 hours, with stirring. The solution is then cooled and the dyestuff is recovered by pouring the said solution into a mixture of ice and water. After stirring, the dyestuff is filtered off, washed with water and dried.

The dyestuffs so prepared dye cellulose acetate and other organic derivative of cellulose materials in valuable blue shades having a good resistance to acid fading. Moreover, when the dyed materials are subjected to severe acid fading conditions, they tend to fade primarily on tone rather than on shade, i. e. they tend to become lighter but do not tend to turn pink, so that the fading is less noticeable. The dyed materials exhibit a greenish blue shade which is desirable in that it will show a lesser change in shade when viewed under artificial light as compared with daylight.

The following examples are given to illustrate this invention further.

*Example I*

A solution of 0.5 part by weight of naphthazarin intermediate, 1.0 part by weight of sodium acetate and 1.0 part by weight of m-amino benzyl alcohol in 25 parts by weight of 80% aqueous acetic acid is heated, with occasional sitrring, for 2 hours at 90° C. After cooling to about 15° C., the reaction mixture is poured into a stirred mixture of 300 parts by weight of ice and water. After stirring for 20 minutes, the dyestuff is filtered off, washed with water on the filter and dried. There is obtained a yield of 0.44 part by weight or 54% of theory.

*Example II*

The dyestuff prepared in Example I is made up into a dyebath containing 0.3 part by weight of the dyestuff, 3.0 parts by weight of dioxan, 20 parts by weight of Turkey red oil, 2 parts by weight of green soap, 5 parts by weight of sodium pyrophosphate and 7000 parts by weight of water.

This dyebath is used to dye 100 parts by weight of a cellulose acetate fabric by immersing the same for 60 minutes in the said dyebath at a temperature of 80° C., following which the fabric is washed and dried.

The dyestuff has a good affinity for the cellulose acetate fabric and the dyed fabric exhibits a valuable bluish green shade having good light fastness. On exposure to 2 units of acid fading in accordance with the standard acid fading test of the A. A. T. C. C. it shows only a change in tone, without undesirable reddening.

*Example III*

A solution of 0.5 part by weight of naphthazarin intermediate, 1.0 part by weight of sodium acetate and 1.0 part by weight of m-amino phenyl methyl carbinol in 25 parts by weight of 80% aqueous acetic acid is heated, with occasional stirring for 2 hours at 90° C. After cooling to about 15° C., the reaction mixture is poured into a stirred mixture of 300 parts by weight of ice and water. After stirring for 20 minutes, the dyestuff is filtered off, washed with water on the filter and dried. There is obtained a yield of 0.5 part by weight or 58% of theory.

*Example IV*

The dyestuff prepared in Example III is made up into a dyebath in the manner set forth in Example II and employed for dyeing a cellulose acetate fabric. The dyed fabric exhibits substantially the same properties as the fabric dyed with the dyestuff of Example I.

It is to be understood that the foregoing detailed description is given merely by way of illustration and that many variations may be made therein without departing from the spirit of our invention.

Having described our invention, what we desire to secure by Letters Patent is:

1. The dyestuff prepared by heating in acetic acid solution to effect condensation naphthazarin intermediate with a hydroxy alkyl amino benzene in which the hydroxy alkyl group has 1 to 2 carbon atoms.

2. The dyestuff prepared by heating in acetic acid solution to effect condensation naphthazarin intermediate with m-amino benzyl alcohol.

3. The dyestuff prepared by heating in acetic acid solution to effect condensation naphthazarin intermediate with m-amino phenyl methyl carbinol.

4. The dyestuff prepared by heating in acetic acid solution to effect condensation naphthazarin intermediate with from about 1.5 to 3.0 molar equivalents of a hydroxy alkyl amino benzene in which the hydroxy alkyl group has 1 to 2 carbon atoms.

5. The dyestuff prepared by heating in acetic acid solution to effect condensation naphthazarin intermediate with from about 1.5 to 3.0 molar equivalents of m-amino benzyl alcohol.

6. The dyestuff prepared by heating in acetic acid solution to effect condensation naphthazarin intermediate with from about 1.5 to 3.0 molar equivalents of m-amino phenyl methyl carbinol.

7. Process for the production of dyestuffs which comprises heating in acetic acid solution to effect condensation naphthazarin intermediate with a hydroxy alkyl amino benzene in which the hydroxy alkyl group has 1 to 2 carbon atoms.

8. Process for the production of dyestuffs which comprises condensing naphthazarin intermediate with m-amino benzyl alcohol.

9. Process for the production of dyestuffs which comprises condensing naphthazarin intermediate with m-amino phenyl methyl carbinol.

10. Process for the production of dyestuffs which comprises heating in acetic acid solution to effect condensation naphthazarin intermediate with from about 1.5 to 3.0 molar equivalents of a hydroxy alkyl amino benzene in which the hydroxy alkyl group has 1 to 2 carbon atoms.

11. Process for the production of dyestuffs which comprises heating naphthazarin intermediate with a hydroxy alkyl amino benzene, in which the hydroxy alkyl group has 1 to 2 carbon atoms, in an acetic acid solution at a temperature of about 80 to 100° C. for a period of between about 1 and 3 hours to effect condensation.

12. Process for the production of dyestuffs which comprises heating naphthazarin intermediate with from about 1.5 to 3 molar equivalents of a hydroxy alkyl amino benzene, in which the hydroxy alkyl group has 1 to 2 carbon atoms, in an acetic acid solution at a temperature of about 80 to 100° C. for a period of between about 1 and 3 hours to effect condensation, there being present from about 5 to 60 parts by weight of acetic acid for each part by weight of naphthazarin intermediate.

13. Process for the production of dyestuffs which comprises heating naphthazarin intermediate with from about 1.5 to 3.0 molar equivalents of a hydroxy alkyl amino benzene, in which the hydroxy alkyl group has 1 to 2 carbon atoms, in an acetic acid solution containing from about 1 to 3 parts by weight of sodium acetate for each part by weight of naphthazarin intermediate at a temperature of about 80 to 100° C. for a period of between about 1 and 3 hours to effect condensation.

14. Organic derivative of cellulose materials dyed with the dyestuff of claim 1.

15. Cellulose acetate materials dyed with the dyestuff of claim 1.

References Cited in the file of this patent

UNITED STATES PATENTS

| Number | Name | Date |
|---|---|---|
| 2,066,119 | Mettler | Dec. 29, 1936 |
| 2,135,366 | Linker | Nov. 1, 1938 |
| 2,183,870 | Robl | Dec. 19, 1939 |